United States Patent
Wansley et al.

(10) Patent No.: US 9,842,298 B1
(45) Date of Patent: Dec. 12, 2017

(54) PROVIDING AN INQUIRY BASED ON DEFICIENT PLAN INFORMATION USING EMAIL/CHAT AND CONFIDENCE LEVELS

(71) Applicant: Google Inc., Mountain View, CA (US)

(72) Inventors: Andrew Theodore Wansley, San Francisco, CA (US); Amay Nitin Champaneria, San Francisco, CA (US); Frederick Peter Brewin, San Francisco, CA (US); Jason Luther Smart, Alamo, CA (US)

(73) Assignee: GOOGLE LLC, Mountain View, CA (US)

( * ) Notice: Subject to any disclaimer, the term of this patent is extended or adjusted under 35 U.S.C. 154(b) by 593 days.

(21) Appl. No.: 14/321,607

(22) Filed: Jul. 1, 2014

(51) Int. Cl.
  *G06F 17/00* (2006.01)
  *G06N 5/04* (2006.01)

(52) U.S. Cl.
  CPC ..................... *G06N 5/04* (2013.01)

(58) Field of Classification Search
  USPC ...................................... 706/12, 45
  See application file for complete search history.

(56) References Cited

U.S. PATENT DOCUMENTS

| | | | |
|---|---|---|---|
| 6,092,048 A | 7/2000 | Nakaoka | |
| 8,010,396 B2 | 8/2011 | Gura | |
| 8,700,389 B2 | 4/2014 | Latzina et al. | |
| 8,732,101 B1 * | 5/2014 | Wilson | G06N 3/063 706/15 |
| 2013/0041696 A1 * | 2/2013 | Richard | G06Q 50/14 705/5 |
| 2013/0046788 A1 * | 2/2013 | Goldstein | G06Q 10/109 707/780 |
| 2014/0067596 A1 * | 3/2014 | McGovern | G06Q 30/02 705/26.7 |
| 2015/0142789 A1 * | 5/2015 | Parundekar | G06F 17/3053 707/724 |
| 2015/0248707 A1 * | 9/2015 | Mi | G06Q 30/0269 705/14.66 |

FOREIGN PATENT DOCUMENTS

WO 2010049747 5/2010

OTHER PUBLICATIONS

Bellotti et al., Activity-Based Serendipitous Recommendations with Magitti Mobile Leisure Guide, 2008, CHI 2008, ACM, pp. 1157-1166.*

* cited by examiner

*Primary Examiner* — David Vincent
(74) *Attorney, Agent, or Firm* — Middleton Reutlinger

(57) ABSTRACT

Methods and apparatus related to determining an inquiry to provide to a user based on deficient information related to a plan of the user. Deficient information may be determined based on an insufficient association between a desired information item of the plan and a set of information items that are determined from one or more sources associated with the user. In some implementations, the user may provide, responsive to the inquiry, additional information related to the deficient information and a suggestion may be provided to the user based on the additional information.

9 Claims, 7 Drawing Sheets

FIG. 4A

Is the following information related to your trip?

Hotel Reservations

Location: Chicago Hotel
Check-in: August 1, 2014
Check-out: August 5, 2014

Yes | No

FIG. 4B

Have you made hotel reservations yet?

Yes

Show me hotel information

I don't need hotel reservations

FIG. 4C

Please provide hotel information:

Location:
Check-in:
Check-out:

OK | Cancel

PROVIDING AN INQUIRY BASED ON DEFICIENT PLAN INFORMATION USING EMAIL/CHAT AND CONFIDENCE LEVELS

BACKGROUND

A user may have interest in performing a task and the user may be associated with one or more sources that are related to the task. The user may be provided with suggestions related to the task. For example, a user may be associated with one or more documents related to traveling to a location and the user may be provided with additional information that is related to the travel location.

SUMMARY

The present disclosure is generally directed to methods and apparatus for determining an inquiry related to deficient information about a plan. For example, implementations of the disclosure are directed to methods and apparatus to identify plan information items from one or more sources associated with a user, determine a set of the plan information items that are associated with desired information items of a plan, determine one or more deficient information items of the plan, and provide an inquiry to the user based on the one or more deficient information items. Some implementations are further directed to methods and apparatus to receive additional information from the user that is responsive to the inquiry and provide a suggestion to the user based on the additional information.

Determining a deficient information item for a plan may be based on identifying a desired information item of the plan that has an insufficient association with the set of plan information items. In some implementations, the insufficient association may be that the desired information item is not associated with any of the information items of the set. In some implementations, the insufficient association may be that the desired information item and one or more plan information items of the set are associated, but that a confidence level associated with the plan information item association does not satisfy a threshold value. A confidence level of a plan information item may be based on confidence that the source of the plan information item includes the plan information item, the type of source that was utilized to determine the plan information item, and/or that the associated desired information item is related to the plan information item. In some of those implementations, the insufficient association may be that the desired information item is associated with multiple plan information items of the set that conflict with each other such that the correct information to associate with the desired information item may not be determined with a threshold confidence. For example, a desired information item may be associated with a first plan information item of a hotel reservation for May 1 and a second plan information item of a hotel reservation for May 10; and the correct plan information item to associate with the desired information item may not be determined with a threshold confidence.

As one example, a plan information item related to a flight of a user may be identified from an email of a user. Additionally, a plan information item related to a hotel reservation of the user may be identified from a second email of the user. A set of plan information items may be determined that includes the flight plan information item and/or a plan information item that is an indication that the user is associated with a flight, and the hotel plan information item and/or a plan information item that is an indication that the user is associated with a hotel. The set may be determined based on identifying, for example, that the flight destination and the location of the hotel are in the same city and related to a plan for the user to visit the city. The plan may have a desired information item of a mode of transportation, which may not be identified from sources that are associated with the user and/or a plan information related to a mode of transportation may not be determined with sufficient confidence. An inquiry may be provided to a computing device of the user that prompts the user to confirm and/or input information about an intended mode of transportation. In some implementations, the additional information received responsive to the inquiry may be utilized to, for example, determine one or more suggestions to provide to the user. For example, one or more suggestions may be determined that are related to the transportation information (e.g., public transit maps, driving directions, estimated cab fares) and/or that are otherwise determined based on the transportation information (e.g., restaurant suggestions or tourist attraction suggestions that are conducive to the transportation information).

In some implementations, a method is provided that includes the steps of: identifying one or more plan information items from one or more sources associated with a user; determining a set of the plan information items, each of the plan information items of the set associated with at least one desired information item of a plan; determining a deficient information item of the desired information items, the determining based on an insufficient association between the deficient information item and the plan information items of the set; and providing an inquiry to a computing device of the user, the inquiry related to the deficient information item.

This method and other implementations of technology disclosed herein may each optionally include one or more of the following features.

The plan may be related to travel. The insufficient association may be absence of an association between the desired information item and any of the plan information items of the set. The insufficient association may be insufficient confidence in an association between the desired information item and at least one of the plan information items of the set. The step of determining the deficient information item may include the steps of: determining a confidence level for each of the one or more plan information items of the set, wherein the confidence level of a given plan information item of the set is indicative of likelihood that the given plan information item is related to the plan; and determining the deficient information item based on the confidence level of the deficient information item.

The method may further include the steps of: receiving additional information from the user responsive to the inquiry, wherein the additional information is related to the deficient information item; determining a suggestion based on the additional information, wherein the suggestion is related to the plan; and providing the suggestion to the user. In some implementations, the method may further include the step of tailoring the suggestion based on the additional information. In some implementations, the method may further include the steps of: determining a plurality of possible suggestions based on the set of the plan information items; and selecting the suggestion from the plurality of possible suggestions based on the additional information. In some of those implementations, the method may further include the steps of: ranking the plurality of possible suggestions based on the additional information; and selecting the possible suggestion based on the ranking.

The method may further include the steps of: determining a plurality of potential deficient information items, wherein each of the potential deficient information items is insufficiently associated with the plan information items of the set; and identifying a ranking of the plurality of potential deficient information items; and selecting the deficient information item based on the ranking. The ranking of a given potential deficient information item may be indicative of an extent to which additional information related to the given potential deficient information item will improve determination of one or more suggestions related to the plan.

Other implementations may include a non-transitory computer readable storage medium storing instructions executable by a processor to perform a method such as one or more of the methods described herein. Yet another implementation may include a system including memory and one or more processors operable to execute instructions, stored in the memory, to perform a method such as one or more of the methods described herein.

Particular implementations of the subject matter described herein determine an inquiry to provide to a computing device user that is related to deficient information of a plan of the user. In some implementations, the user may provide additional information in response to the inquiry and the additional information may be utilized to determine and/or provide a suggestion to the user that is related to the plan. Deficient information related to a plan may be determined based on desired information of the plan that is not sufficiently associated with plan information items from one or more sources associated with the user.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 4A illustrates an example graphical user interface for displaying an inquiry that may be provided to a user.

FIG. 4B illustrates another example graphical user interface for displaying an inquiry that may be provided to a user.

FIG. 4C illustrates another example graphical user interface for displaying an inquiry that may be provided to a user.

DETAILED DESCRIPTION

Figure 1:
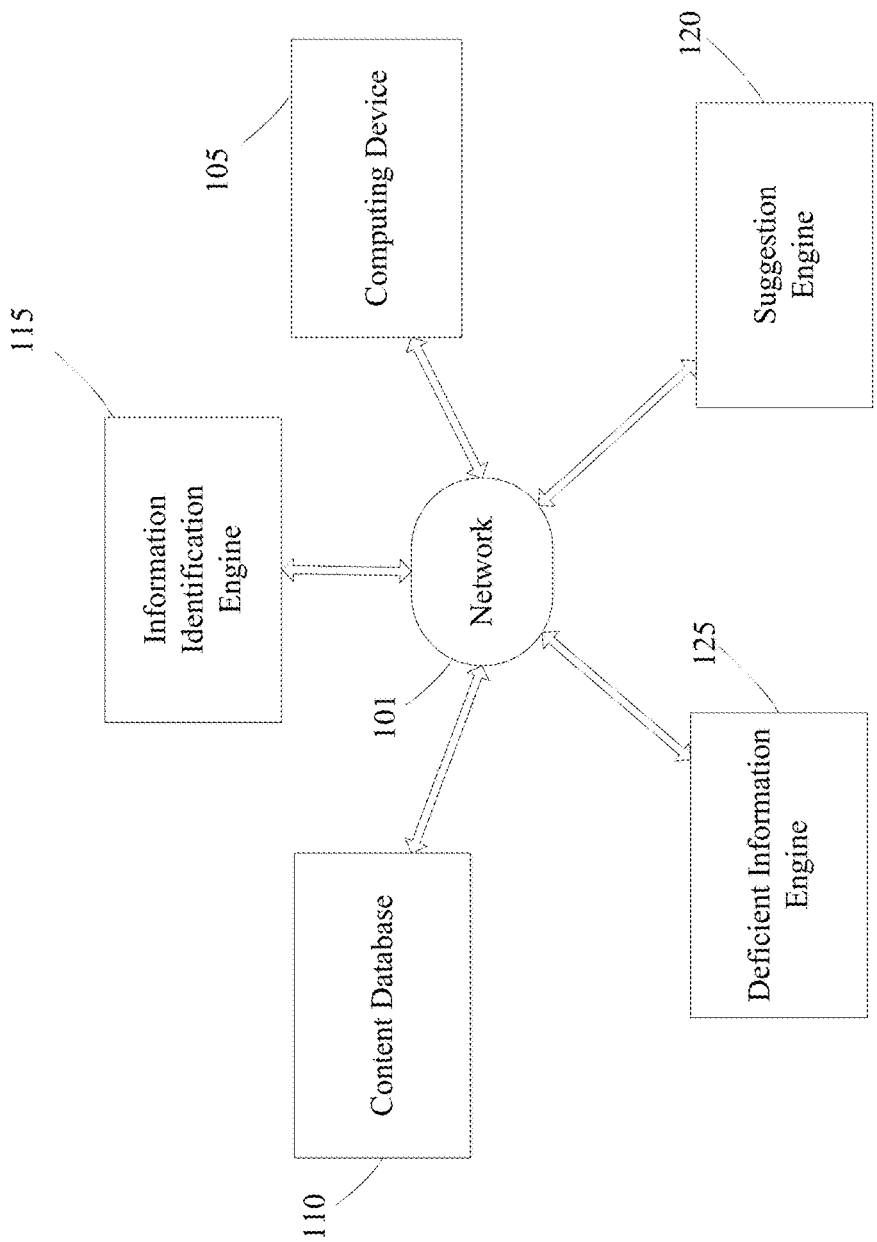
FIG. 1 illustrates a block diagram of an example environment in which an inquiry related to deficient information of a plan may be determined.

A user may be associated with one or more sources that are associated with the user performing a planning a task and/or with the user currently performing a plan that has not yet been completed. As used herein, sources of a user may include, for example, one or more of: communications sent or received by the user, such as emails, text messages, social networking communications (e.g., posts, tweets, private messages); searches of the user submitted to one or more search engines; calendar entries of the user; task entries of the user; location data of the user; spreadsheets of the user (e.g., that the user uses to organize a task); browsing history of the user (e.g., indicating one or more documents accessed by the user such as webpages, videos, and/or images); application purchase history of the user; application usage and/or install history; and so forth. For example, a user may be associated with one or more emails and/or other documents that include information related to a plan of the user to perform a task. Plan information items may be identified from the sources associated with the user and a suggestion that is related to the plan may be determined based on the plan information items identified from the sources. However, in some instances, a plan information item to associate with a desired information item of the plan may not be identified from a source and/or a plan information item may not be associated with a desired information item with sufficient confidence. It may be desirable, for various purposes, to clarify the deficient information that is not identified or not identified with sufficient confidence. For example, it may be desirable to clarify the deficient information to improve determined suggestions that are related to the plan. Implementations of the disclosure are directed to determining deficient information for a plan and providing an inquiry to a computing device of the user that is related to the deficient information item. The inquiry may be tailored to solicit additional information that is related to the deficient information item and additional information may be received from the user responsive to the inquiry. The additional information may be utilized, for example, to determine a suggestion to provide the user that is related to the plan of the user.

For example, a user may be associated with a first source that includes flight information of the user and a second source that includes car rental information of the user. Plan information items may be determined based on the sources, such as a destination of travel, time/dates of travel, and transportation information for the user. A set of the plan information items may be determined based on associations between the plan information items and desired information items of a "traveling to a location" plan. For example, the "traveling to a location" plan may be associated with a desired information items of "flight information" and "transportation information" and the plan information item of flight information may be associated with the "flight information" desired information item and the car rental reservation plan information item may be associated with the "transportation information" desired information item. The "traveling to a location" plan may additionally be associated with a desired information item of "hotel reservations" and a plan information item that includes hotel reservations may not have been identified from the sources associated with the user. Based on determining the "hotel reservations" item is a deficient information item, the user may be provided with an inquiry to determine whether the user has made hotel reservations. The user may provide additional information in response to the inquiry, such as hotel reservation information, a response that hotel reservations have not been made, and/or identification of a source that may be utilized to identify an information item related to hotel reservations (e.g., the user identifying an email that includes hotel reservation information). The additional information may be utilized to determine a suggestion and/or to determine a plan information item to associate with the desired information item that corresponds to the deficient information item. In some implementations, the user may be provided with a suggestion based on the additional information, such as a suggestion that identifies restaurants near the hotel of the user if the additional information indicates the user has booked a hotel or a suggestion that identifies one or more hotels if the additional information indicates a hotel has not been booked.

Determining deficient information items for a plan may be based on determining one or more desired information items of a plan that are not sufficiently associated with any of the identified plan information items of the set. In some implementations, a deficient information item may be a desired information item that is not associated with any plan information item (e.g., lack of association with any plan information items). For example, a plan may include desired information items of "hotel reservations" and "flight information," and "flight information" may be a deficient information item if a plan information item that includes flight information is not included in the set of plan information items. In some implementations, a deficient information item may be determined based on an identified association between a desired information item and a plan information item, but where a confidence level for the plan information item does not satisfy a threshold confidence. In some implementations, multiple plan information items with conflicting information may be associated with the same desired information item with the same or similar confidence levels, and the desired information item may be determined to be a deficient information item based on the conflicting information. In some implementations, one or more of the desired information items of a plan may be ranked based on importance of the desired information item and the deficient information item may be determined based on the ranking. For example, two desired information items may be insufficiently associated with plan information items and the higher ranked desired information item may be selected as the deficient information item based on the likely greater importance of information related to that desired information item. Ranking of a desired information item may be based on, for example, the number of suggestions that may be provided if additional information is known about the desired information item, the specificity of suggestions that may be determined if additional information is known, and/or the ranking may be based on likelihood that additional information exists and was not previously identified as a plan information item.

FIG. 1 illustrates a diagram of an example environment in which an inquiry related to deficient information of a plan may be determined. The example environment includes a communication network 101 that facilitates communication between the various components in the environment. In some implementations, the communication network 101 may include the Internet, one or more intranets, and/or one or more bus subsystems. The communication network 101 may optionally utilize one or more standard communications technologies, protocols, and/or inter-process communication techniques. The example environment also includes a computing device 105, a content database 110, an information identification engine 115, a suggestion engine 120, and a deficient information engine 125.

The computing device 105 may execute one or more applications, such as those that facilitate user consumption and/or manipulation of certain sources associated with the user, those that provide certain sources to information identification engine 115, those that facilitate provision of inquiries provided by deficient information engine 125, and/or those that facilitate provision of suggestions provided by suggestion engine 120. For the sake of brevity, only a single computing device 105 is illustrated in FIG. 1 and described in some examples herein. However, techniques described herein may be utilized to provide inquiries to multiple users via multiple client devices. Moreover, although a user will likely operate a plurality of computing devices, and sources may be based on activities via multiple of the computing devices and/or inquiries and/or suggestions may be provided to multiple of the computing devices, for the sake of brevity, certain examples described in this disclosure will focus on the user operating computing device 105.

Figure 8:
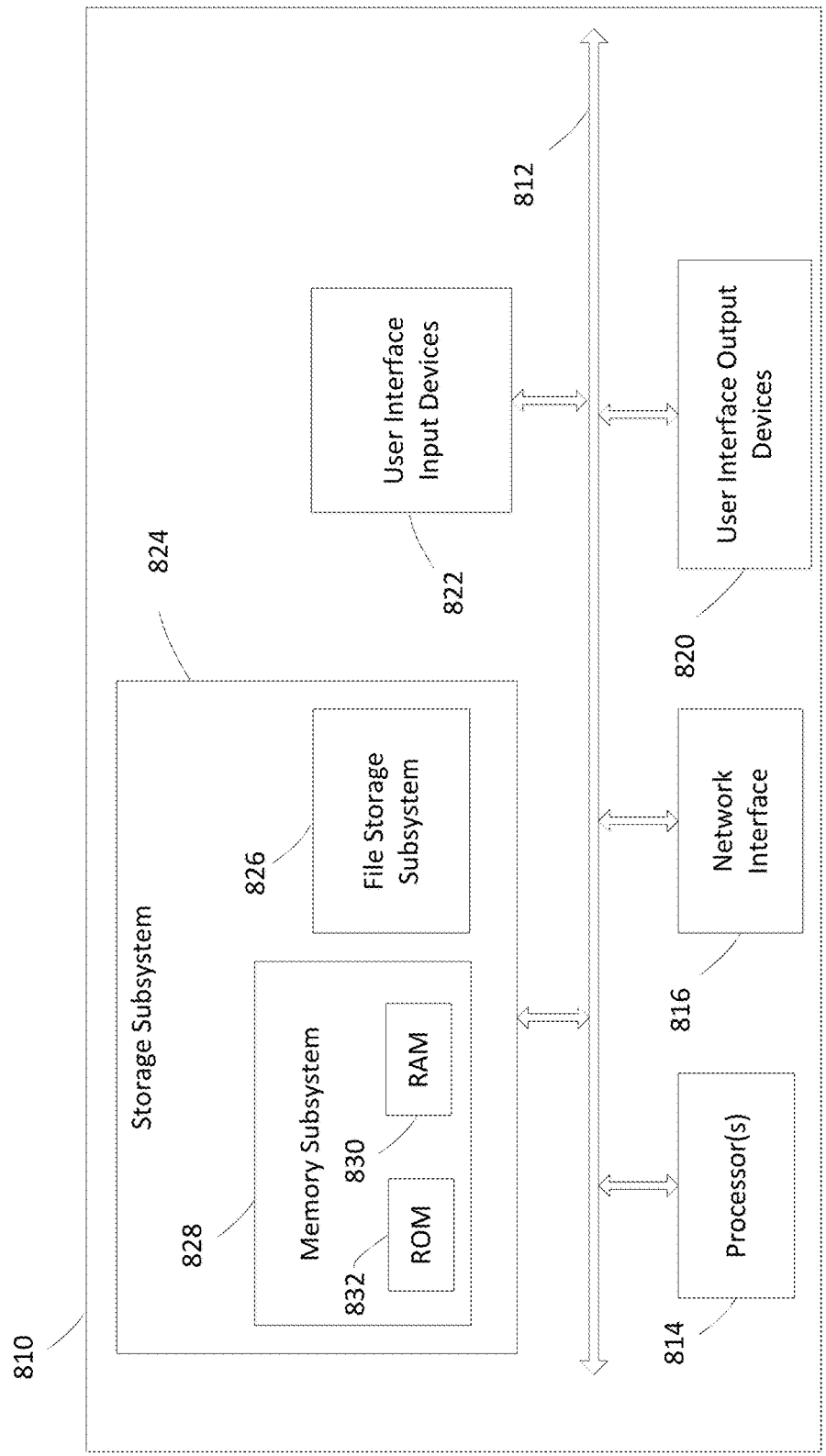
FIG. 8 illustrates a block diagram of an example computer system.

The computing device 105, the information identification engine 115, the suggestion engine 120, the deficient information engine 125, and/or one or more additional components of the example environment of FIG. 1 may each include memory for storage of data and software applications, a processor for accessing data and executing applications, and components that facilitate communication over a network. In some implementations, the components may include hardware that shares one or more characteristics with the example computer system that is illustrated in FIG. 8.

In this specification, the term "database" will be used broadly to refer to any collection of data. The data of the database does not need to be structured in any particular way, or structured at all, and it can be stored on storage devices in one or more locations. Thus, for example, the database may include multiple collections of data, each of which may be organized and accessed differently. Also, in this specification, the term "entry" will be used broadly to refer to any mapping of a plurality of associated information items. A single entry need not be present in a single storage device and may include pointers or other indications of information items that may be present on other storage devices. For example, an entry may include multiple nodes mapped to one another, with each node including an identifier of an entity or other information item that may be present in another data structure and/or another storage medium.

In some implementations, content database 110 may include one or more storage media and may be utilized to store and/or access one or more aspects of information described herein. For example, content database 110 may be utilized by one or more components to store, modify, and/or access content from one or more sources associated with a user. Also, for example, content database 110 may be utilized by one or more components to store, modify, and/or access one or more plan information items, additional information provided by a user, and/or plans of a user, as described herein. In some implementations, the content database 110 may store content and/or sources of multiple users, and, for each user, access to the source and/or content of the user may be allowed only for the user and/or one or more other users or components authorized by the user, such as information identification engine 115, suggestion engine 120, and/or deficient information engine 125. In some other implementations, the content database 110 may store only content and/or sources for a single user.

In some implementations, content database 110 may store one or more plans and desired information items related to the stored plans. A plan represents a future task that the user has interest in performing and/or a task that the user has started performing but has not yet completed. For example, a plan may be "travel to a location" and may represent user intention on taking a trip to a location. In some implementations, a plan may be a task that includes multiple subtasks to be performed by the user. For example, a plan may be "planning a vacation" and may represent user intention to take steps to plan a vacation.

Content database 110 may also include, for each plan, one or more desired information items that are associated with the plan. Desired information items are descriptions of types of information that may be associated with a plan. In some implementations, desired information items are categories of information that are associated with a plan. For example, a plan of "traveling to a location" may be associated with desired information items of "location of travel," "flight information," "hotel information," and/or "transportation information." In some implementations, desired information items may be one or more subtasks that may be performed to complete the associated plan. For example, a plan of "planning a vacation" may be associated with the desired information items of "booking a hotel," "getting a passport," and/or "making dinner reservations." In some implementations, desired information items may be general desired information, such as "flight information." In some implementations, desired information items may be specific information related to broader desired information, such as desired information items of "departure airport," "arrival time," and/or "arrival airport."

Figure 2:
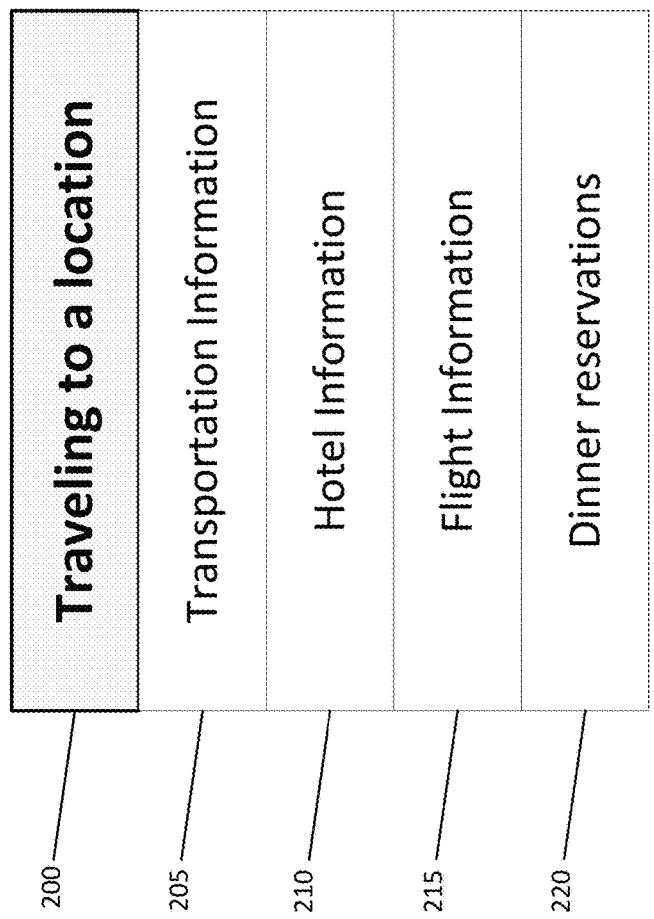
FIG. 2 illustrates a representation of a plan is with desired information items.

Referring to FIG. 2, a representation of a plan is provided with desired information items. The representation includes a plan name 200 and desired information items associated with the plan. Transportation item 205 may be a desired information item to represent information that is associated with transportation of the user when the user arrives at the travel location. Hotel item 210 may be a desired information item that represents information that is related to hotel reservations (e.g., check-in date, check-out date, location of the hotel, cost of the hotel). Flight item 215 may be a desired information item that represents information related to a flight of the user (e.g., departure time, arrival time, destination). Dinner reservation item 220 may be a desired information item that represents information associated with dinner reservations of the user while the user is at the location (e.g. reservation times, restaurant location, type of cuisine). Additional and/or alternative desired information items may be associated with a plan of "traveling to a location," such as "location name," "travel purpose," and/or "planned events."

In some implementations, desired information items of a plan may be ranked relative to each other. In instances where multiple desired information items of a plan are insufficiently associated with plan information items, the ranking of the desired information items may be utilized to determine which of the desired information item to determine as a deficient information item. For example, referring to FIG. 2, if a plan information item is not sufficiently associated with hotel item 210 and additionally a plan information item is not sufficiently associated with flight item 215, the desired information item with the higher ranking may be selected as the deficient information item.

In some implementations, desired information items of a plan may be ranked based on importance of each desired information item to the plan. For example, referring to FIG. 2, hotel item 210 may be more important information to associate with a "traveling to a location" plan than restaurant reservation item 220 because traveling to a location is more likely to include the user staying at a hotel than to include making dinner reservations (e.g., traveling does not include dinner reservations as often as traveling includes staying at a hotel). Also, for example, one or more desired information items may be essential to a plan, such as a "location" desired information item for a "traveling to a location" plan.

Information identification engine 115 may determine one or more plan information items from sources associated with a user. In some implementations, information identification engine 115 may identify one or more sources from content database 110. Sources may include, for example, emails, web browsing history, search queries, documents, calendar entries, reminders, and/or other sources of information that are associated with the user. In some implementations, information identification engine 115 may identify one or more sources from computing device 105 and/or one or more other computing devices associated with the user. A plan information item represents information that is identified from one or more sources that are related to a user. In some implementations, information identification engine 115 may identify a source based on one or more terms that are identified from the source. For example, identification engine 115 may identify one or more emails that include the terms "hotel," "vacation," and/or "flights" as sources that may include information related to the user planning to travel to a location. In some implementations, information identification engine 115 may identify sources related to a plan based on one or more entities associated with the sources. For example, information identification engine 115 may identify a message that has been associated with a "travel" entity, a "hotel" entity, and/or an entity of a location (e.g., a "Chicago" entity).

In some implementations, information identification engine 115 may determine one or more plan information items based on information from a source. For example, information identification engine 115 may identify an email that is associated with a plan based on the source including flight information, and further determine a plan information item that includes specific flight information that is determined from the email, such as departure time, arrival time, destination, and/or airport addresses. Also, for example, information identification engine 115 may identify a calendar entry of a user and determine a plan information item from the calendar entry, such as a calendar entry of "Business trip to Florida" in a calendar application. Also, for example, information identification engine 115 may identify a social network posting of a user that includes one or more terms that are indicative of a plan, such as a posting of "I booked a vacation to Florida" on a social networking site.

In some implementations, information identification engine 115 may determine a confidence level to associate with the plan information item. For example, information identification engine 115 may determine a confidence level for a plan information item that includes flight information based on likelihood that the information identified from a source is related to an upcoming flight of the user. In some implementations, a confidence level of a plan information item may be based on the type of source. For example, information identification engine 115 may determine confidence levels for a plan information item determined from an email that is less indicative of confidence than a plan information item determined from a calendar entry. In some implementations, information identification engine 115 may determine a confidence level for a plan information item based on the originator of the source. For example, an email from a travel agent may be more likely to include plan information items than a mass email. In some implementations, a confidence level of a plan information item may be determined based on the content of the source. For example, a confidence level may be determined based on presence and/or absence of one or more terms that are indicative of definiteness of the plan information, such as a plan information item determined from an email that includes the terms "I am going to Florida" versus a plan information item determined from an email that includes the terms "I'm thinking about going to Florida."

Information identification engine 115 may determine a set of plan information items based on associations between the plan information items and one or more plans of the user. In some implementations, a set of plan information items may be determined based on similarity between the plan information items of the set. For example, information identification engine 115 may determine a set of plan information items that includes a plan information item for a flight to Chicago, a plan information item for a hotel reservation in Chicago, and a plan information item that includes a car rental reservation in Chicago based on the plan information items including information related to Chicago. Additionally or alternatively, for example, information identification engine 115 may determine the same set of plan information items based on the plan information items including dates that coincide with the same time period (e.g., car rental and hotel reservation information that occurs between the departing and return flight times).

In some implementations, a confidence level for a plan information item may be based on confidence of an association between a plan information item and a desired information item of a plan. For example, a confidence level of a plan information item may be based on the confidence that the plan information item includes information related to the associated desired information item and/or that the plan information item includes information related to the associated plan. For example, a set of plan information items may be determined that includes a plan information item of flight information, the plan information item may be associated with a desired information items of "flight reservations" of a "traveling to a location" plan. A confidence level may be determined for the association based on, for example, the flight information being related to the same plan as one or more of the other plan information items that are associated with the "traveling to a location" plan.

In some implementations, multiple plan information items that are associated with a desired information item may include conflicting information. For example, two plan information items may be determined for flight information of a user and both plan information items may be associated with the same plan. The two plan information items may include information related to two separate flights that the user is taking to a location at different times. In instances where a desired information item is associated with conflicting information from two or more plan information items, confidence levels of the plan information items may be utilized to determine the most likely plan information item to associate with the desired information item. In some implementations, confidence levels between the plan information items and the desired information item may be utilized to determine the most likely information to associate with the desired information item. For example, two plan information items may be associated with a desired information item, and the plan information item with the higher confidence level may be selected as the associated plan information item for the desired information item. Also, for example, both plan information items may be associated with the same desired information item and a user may provide additional information related to the plan to disambiguate the plan information items.

Figure 3:
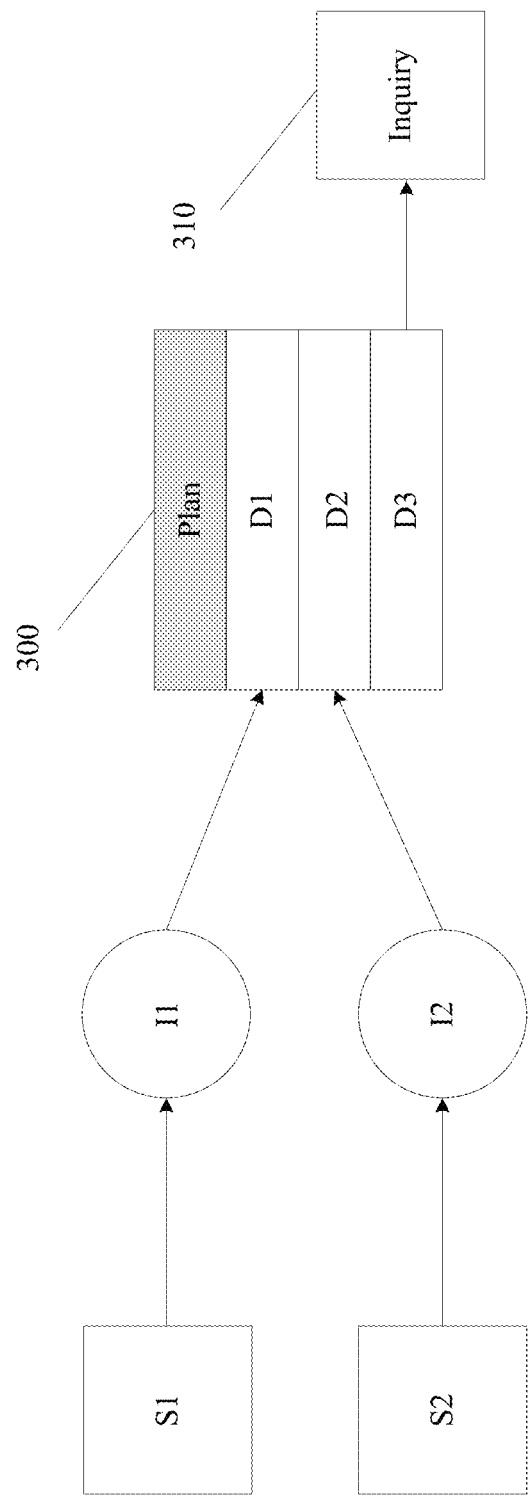
FIG. 3 illustrates a representation of plan information items that are associated with desired information items of a plan.

Referring to FIG. 3, a representation of plan information items that are associated with desired information items of a plan is illustrated. S1 and S2 are two sources that may be associated with the user and may be utilized by identification information engine 115 to determine plan information items I1 and I2, respectively. S1 and S2 may be, for example, emails, messages, calendar entries, browsing history, and/or previous search queries of the user. I1 and I2 may be determined based on, for example, one or more terms of S1 and S2 and/or one or more entities associated with S1 and S2.

Information identification engine 115 may determine a set that includes I1 and I2 based on the plan information items. For example, information identification engine 115 may identify common information between I1 and I2, such as related locations between I1 and I2, identifying that I1 and I2 are related tasks, and/or one or more other commonalities between the plan information items (e.g., similar dates). Information identification engine 115 may identify a plan 300 to associate with the plan information items and further identify desired information items of the plan 300 that are associated with I1 and I2. For example, in FIG. 3, I1 is associated with desired information item D1 of plan 300 and I2 is associated with desired information item D2 of plan 300.

In some implementations, plan information items of a set of information items may be associated with multiple potential plans. For example, information identification engine 115 may identify two separate plans of a user traveling to a location, such as two separate plans for the user traveling to Chicago at two different times. In some implementations, information identification engine 115 may not have enough information to determine which of the plans to associate with a given plan information item (e.g. a plan information item may have information related to a hotel reservation in Chicago but may not include specific dates). In instances where a plan information item may be associated with multiple plans and/or a plan information item that is included in multiple sets of plan information items, information identification engine 115 may determine that the plan information item is associated with both plans and later determine which is the correct association based on additional information provided by the user, as described herein.

Deficient information engine 125 determines deficient information for a plan that is associated with plan information items. A deficient information item is a desired information item that is not sufficiently associated with one or more plan information items. In some implementations, insufficient association for a desired information item may be lack of association of the desired information item with a plan information item. For example, referring to FIG. 3, desired information item D1 and desired information item D2 are associated with plan information item I1 and I2, respectively; and desired information item D3 is not associated with a plan information item. In that instance, deficient information engine 125 may determine that D3 is a deficient information item based on the lack of association of D3 with a plan information item. In some implementations, insufficient association of a desired information item may be that the confidence level of a plan information item that is associated with the desired information item does not satisfy a threshold confidence. For example, again referring to FIG. 3, information identification engine 115 may determine a confidence level for the association between plan information item I1 and desired information item D1 that does not meet a threshold confidence that I1 is associated with desired information item D1 and/or that plan information item is associated with plan 300. Deficient information engine 125 may determine that D1 is deficient information based on the confidence level not meeting a threshold level.

In some implementations, one or more plan information items of the set may be associated with multiple potential plans, as previously described. For example, a set may include plan information items A and B, and both A and B may be associated with desired information items of Plan 1, which has desired information items of A, B, and C. Additionally, both A and B may be associated with desired information items of Plan 2, which has desired information items of A, B, C, and D. In this example, deficient information engine 125 may determine that D is the deficient information item based on determining that, if additional information were known about C, both Plan 1 and Plan 2 may be the plan of interest to the user; and that additional information related to D would disambiguate between Plan 1 and Plan 2 (e.g., if there is additional information related to D, then it is more likely that the user has interest in Plan 2 and not in Plan 1).

Deficient information engine 125 may determine an inquiry to provide to the user. An inquiry may include a notification to the user based on the one or more deficient information items that informs the user of an unknown and/or unclear aspect of a plan. For example, an inquiry to a user may include a notification that plane flight information has not been identified. Also, for example, an inquiry to a user may include a notification that information related to multiple plane flights has been identified and to verify which flight information is correct. In some implementations, deficient information engine 125 may provide multiple inquiries to the user based on the one or more deficient information items. For example, deficient information engine 125 may identify multiple desired information items that are not associated with plan information items and provide an inquiry that is related to each of the deficient information items. The inquiry provided to the user may solicit the user to provide additional information that is responsive to the notification. For example, an inquiry may be provided to the user that indicates one or more deficient information items of a plan and to solicit the user to provide additional information that is related to the deficient information item (e.g., a source where additional information may be identified and/or additional information that may be utilized to determine a plan information item to associate with the deficient information item).

In some implementations, deficient information engine 125 may determine a deficient information item based on rankings of the desired information items of the plan. For example, deficient information engine 125 may provide suggestion engine 120 with a "flight information" deficient information item and a "restaurant reservations" deficient information item for a plan of "travel to a location." Suggestion engine 120 may determine that "flight information" is of more importance than "restaurant reservations" based on, for example, identifying that "travel to a location" includes flights more often than "travel to a location" includes restaurant reservations. In some implementations, deficient information engine 125 may provide suggestion engine 120 with the highest ranked of the deficient information items. For example, deficient information engine 125 may determine a ranking of multiple deficient information items based on confidence levels, as described herein, and provide only one deficient information item based on the ranking (e.g., the deficient information item of the most importance to the plan and/or the deficient information item that is associated with a plan information item with the least confidence). In some implementations, rankings of multiple deficient information items may be based on the extent to which additional information related to each of the multiple deficient information items will improve determination of one or more suggestion related to the plan. For example, an inquiry related to a first deficient information item may be provided over an inquiry related to a second deficient information item if suggestions that may be provided based on additional information related to the first deficient information item are more likely to be tailored to the plan of the user and/or are more specific suggestions than potential suggestions associated with the additional information of the second deficient information item. Likelihood that a suggestion may be tailored to the plan of the user may be based on, for example, identification of plans of previous users and/or plan information items that were associated with previous users, statistical analysis of suggestions that were utilized by other users, and/or suggestions that are better tailored to interests of the user. For example, ranking of a desired information item may be based on identifying the extent to which, if additional information related to the desired information item were known, more pertinent suggestions could be provided to the user based on the additional information.

In some implementations, suggestion engine 120 may determine one or more suggestions that may be provided to the user based on the user providing additional information in response to the inquiry; and determine an inquiry based on the suggestions. For example, in instances where deficient information engine 125 provides suggestion engine 120 with multiple deficient information items, suggestion engine 120 may determine an inquiry to provide to the user that, if the user provides additional information in response to the inquiry, would allow suggestion engine 120 to provide the user with better suggestions and/or more suggestions.

As an example, suggestion engine 120 may be provided with "transportation information" and "hotel information" as deficient information items. Suggestion engine 120 may determine that suggestions related to driving directions and/or public transportation routes may be provided to the user if mode of transportation was known. Additionally, suggestion engine 120 may determine that suggestions related to restaurants near the hotel of the user and/or attractions near the user may be provided to the user if the location of the hotel of the user was known. Suggestion engine 120 may determine an inquiry based on the "hotel information" deficient information item based on determining that suggestions with greater specificity may be provided to the user is additional information is known about the hotel location. Alternatively, for example, suggestion engine 120 may provide an inquiry based on "transportation information" based on determining that two alternate suggestions may be provided and neither may be provided to the user without additional information related to transportation information of the user.

Referring to FIGS. 4A, 4B, and 4C, examples of graphical user interfaces for displaying inquiries are provided. In some implementations, the example interfaces may be provided to the user via a computing device that shares one or more characteristics with computing device 105. In some implementations, the example interfaces may be provided to the user via a personal assistant application. For example, an application may be executing on computing device 105 that provides the user with suggested tasks, reminders of tasks, and/or with other information that may be of interest to the user (e.g., links to webpages of interest, sports scores, driving directions).

In some implementations, the user may be provided with a confirmation inquiry to verify that the plan information item associated with the deficient information item is correct. For example, referring to FIG. 4A, an inquiry is illustrated that may be provided to verify that a plan information item is correctly associated with a desired information item of a plan. For example, deficient information engine 125 may determine that a plan information item of hotel reservations may be associated with a "hotel information" desired information item with a confidence level that does not satisfy a threshold. Deficient information engine 125 may provide the inquiry of FIG. 4A and the user may select "yes" to verify that the plan information item (e.g., the provided hotel reservation information) is correctly associated with a plan of the user.

In some implementations, deficient information engine 125 may provide an inquiry to a user to verify, based on multiple plan information items being associated with a desired information item and having conflicting information, what information is correct for the plan of the user. For example, an inquiry may provide the user with two sets of information from two plan information items that are associated with a deficient information item and the user may identify which of the information items to associate with the deficient information item.

In some implementations, an inquiry may be related to whether a subtask has been performed. For example, referring to FIG. 4B, an example interface of an inquiry related to a subtask is provided. Deficient information engine 125 may determine that a plan of the user planning a vacation is not currently associated with a sub-task of making a hotel reservation and the inquiry of FIG. 4B may be provided to notify the user that hotel reservation information has not been identified by information identification engine 115. In some implementations, the example interface of FIG. 4B may include a "yes" and "no" option without an option to be provided with hotel reservation information. For example, the user may be provided with an inquiry of whether a subtask has been completed and the additional information that is provided to the user is either "yes" or "no." Suggestion engine 120 may then determine the suggestion to provide to the user based on the additional information (e.g., provide hotel information if the additional information is a "no" response from the user).

In some implementations, an inquiry may include a notification to the user that information is not sufficiently associated with a plan and to provide additional information that is related to a deficient information item. For example, referring to FIG. 4C, an example interface of an inquiry is provided that includes fields for a user to provide additional information. The user may select one or more of the fields and provide information that may be utilized to determine a plan information item to associate with the plan. For example, the user may select the "location" field and enter a city name and/or a hotel name. The user may submit the additional information by selecting "OK" and suggestion engine 120 may determine one or more suggestions based on the provided information and/or information identification engine 115 may determine a plan information item to associate with the plan based on the additional information. In some implementations, the user may have the option to identify a source that suggestion engine 120 may utilize to determine additional information related to the deficient information item. For example, the user may be provided with an inquiry to select a particular email that includes the deficient information item and information identification engine 115 may utilize the provided email to determine a plan information item. Also, for example, suggestion engine 120 may determine a suggestion based on information identified from the email that was provided by the user.

Suggestion engine 120 may determine a suggestion based on additional information provided by the user in response to the inquiry. Suggestions include information that may be of use to the user based on the known desired information items and the additional information. For example, for a plan of "traveling to a location" with a deficient hotel information item, additional information related to a hotel reservation of the user may be utilized to provide the user with restaurant suggestion neat the hotel where the user is staying. In some implementations, a suggestion may include information for the user to perform a subtask that is related to the plan. For example, for a plan of "planning a trip to another country," the user may be provided with a suggestion of "get a passport" based on the user providing additional information that indicates that the user has not applied for a passport.

Figure 5:
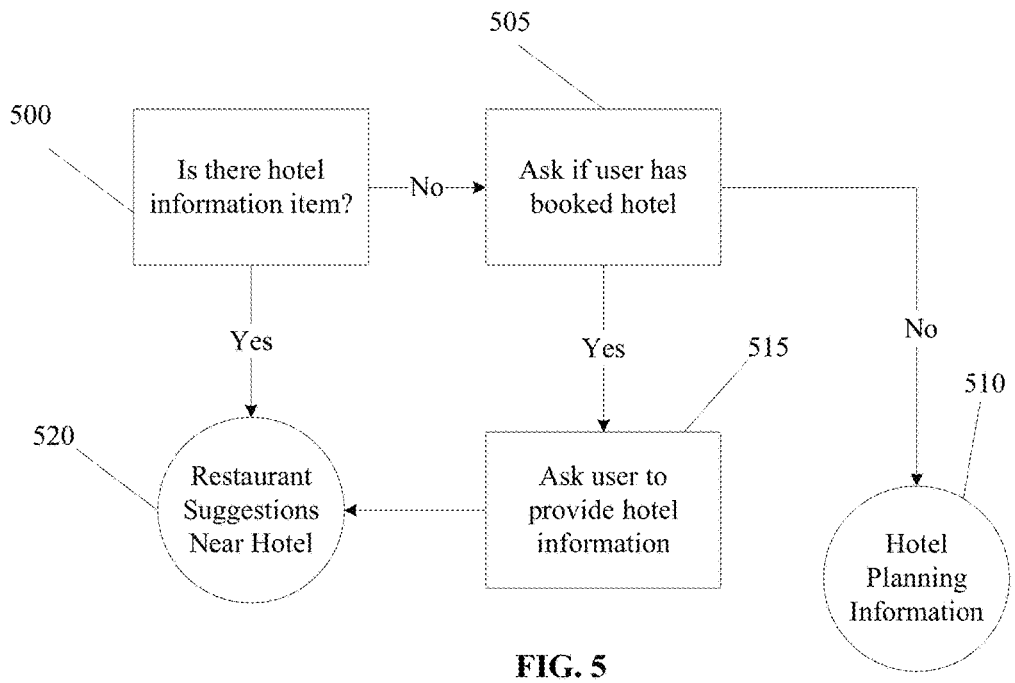
FIG. 5 is a flowchart illustrating an example of providing suggestions to a user based on additional information.

In some implementations, suggestion engine 120 may identify one or more possible suggestions that are related to the type of plan that has been identified for the user. For example, for a plan of "traveling to a location," suggestion engine 120 may identify a "suggest restaurants near hotel" suggestion. Referring to FIG. 5, a flowchart illustrating an example of providing suggestions to a user based on additional information is provided. At step 500, suggestion engine 120 may identify whether hotel information has been identified for the plan. If hotel information has not been identified, suggestion engine 120 may provide an inquiry to the user related to whether the user has booked a hotel at step 505, such as an inquiry that shares one or more characteristics with the inquiry of FIG. 4B. If hotel information has been identified, suggestion engine 120 may provide a suggestion at 520 that is related to restaurants near the hotel location (e.g., provide a suggestion without providing an inquiry to the user if there is no deficient information). The user may provide additional information in response to the inquiry provided at step 505. In some implementations, the user may indicate that hotel reservations have not yet been made, and suggestion engine 120 may provide the user with hotel planning suggestions at 510. If the user indicates that hotel reservations have been made, the user may be further provided an inquiry to indicate the hotel information at step 515. In some implementations, the inquiry at step 515 may share one or more characteristics with the inquiry illustrated in FIG. 4C. Based on the user providing additional information related to hotel reservations, the user may be provided with suggestions of restaurants near the user's hotel at 520.

Figure 6:
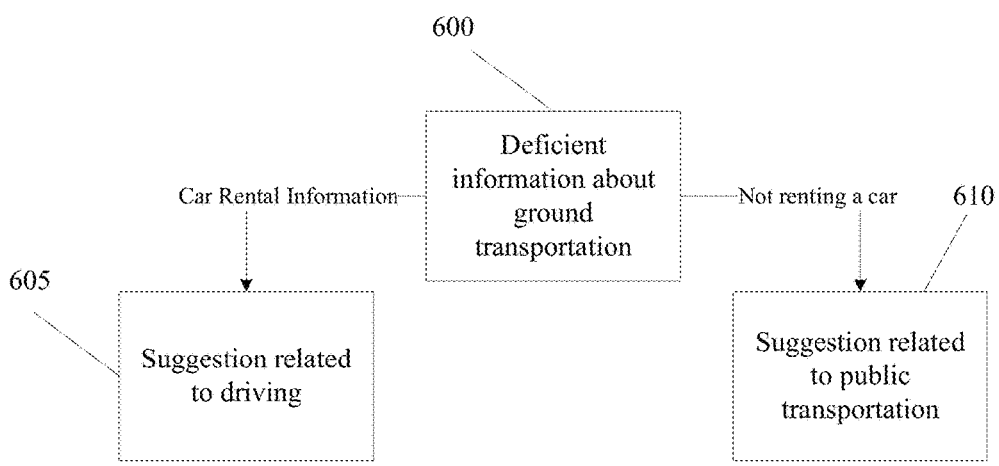
FIG. 6 is a flowchart illustrating an example of tailoring a suggestion based on additional information.

In some implementations, suggestion engine 120 may tailor a suggestion based on the additional information provided by the user. Suggestion engine 120 may have previously identified a type of suggestion and the additional information provided by the user may be utilized to determine a specific suggestion of the suggestion type. For example, referring FIG. 6, a flowchart is provided illustrating an example of tailoring a suggestion based on additional information. Deficient information engine 125 may determine a deficient information item related to ground transportation of the user. Suggestion engine 120 may determine that a suggestion related to ground transportation may be provided to the user if additional information is known about the user's ground transportation plan. Based on the provided additional information, suggestion engine 120 may tailor the suggestion. For example, if the user indicates car rental information, the transportation suggestion 605 may be provide that includes driving directions, such as driving directions between a car rental location and an identified hotel of the user. Alternatively, for example, the user may be provided with a transportation suggestion that includes public transportation routes 610 based on the user providing additional information indicative of not intending to rent a car.

Suggestion engine 120 may provide one or more suggestions that are determined based on the additional information provided by the user via one or more applications executing on computing device 105. In some implementations, a suggestion may be provided via a notification application that provides notifications that have been determined for the user, such as driving directions, sports scores, nearby places of interest, and/or other notifications of interest to the user. In some implementations, suggestions may be ranked with other notifications and/or a confidence level may be associated with a suggestion, and one or more other components may determine an order to provide notifications and the suggestion to the user. For example, based on confidence levels for associations between plan information items and deficient information items, and/or confidence levels of associations between sources and plan information items, a confidence level may be determined for a determined suggestion. The confidence level may be utilized to determine what order the suggestion and one or more other notifications are provided to the user. Also, for example, the confidence level determined for a suggestion may be utilized to determine whether the suggestion is provided to the user (e.g., only provided to the user if the confidence level satisfies a threshold). In some implementations, a suggestion may be provided to the user via one or more other applications, such as a web browser.

Figure 7:
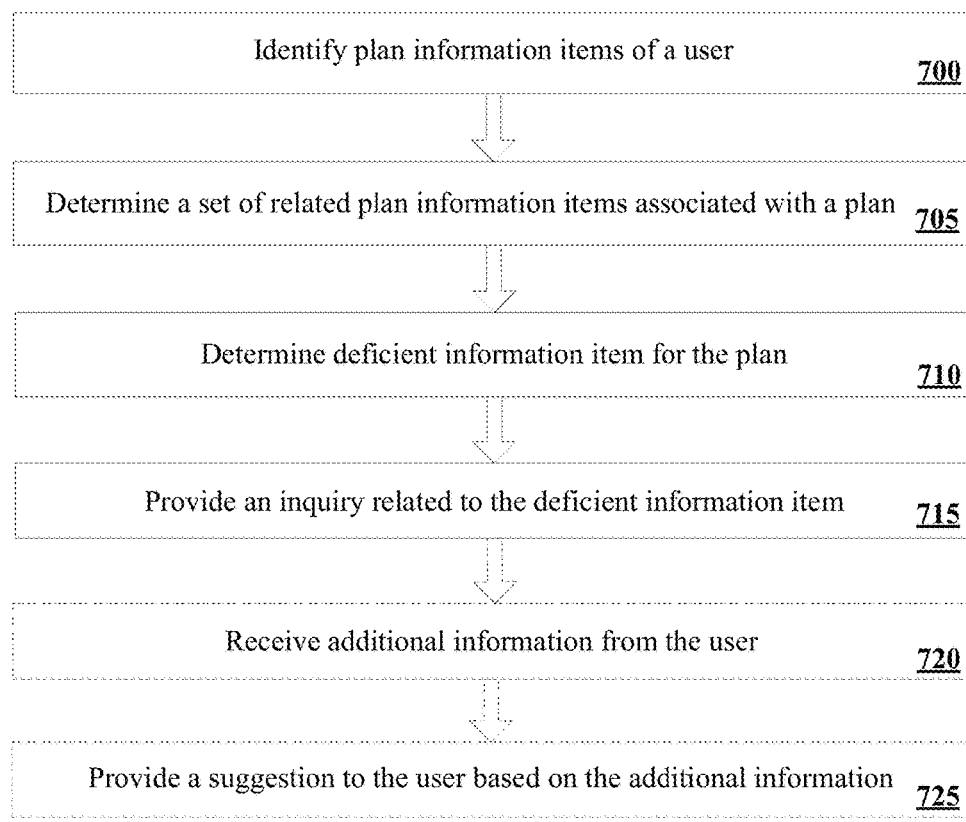
FIG. 7 is a flowchart illustrating an example method of determining an inquiry to provide to a user based on deficient information of a plan of the user.

Referring to FIG. 7, a flowchart is provided illustrating an example method of determining an inquiry to provide to a user based on deficient information of a plan of the user is provided. Other implementations may perform the steps in a different order, omit certain steps, and/or perform different and/or additional steps than those illustrated in FIG. 7. For convenience, aspects of FIG. 7 will be described with reference to one or more components of FIG. 1 that may perform the method, such as the information identification engine 115, deficient information engine 125, and/or suggestion engine 120.

At step 700, one or more plan information items of the user may be identified. Plan information items may be identified by a component that shares one or more characteristics with information identification engine 115. In some implementations, a user may be associated with one or more sources that include information related to a plan to perform a task. Sources may include, for example, documents associated with the user, search queries, browsing history, calendar entries, and/or messages sent and/or received by the user. The sources may be utilized to identify one or more plan information items. For example, plan information items may include hotel reservation information of the user, such as check-in date, check-out date, location, and/or contact information of the hotel.

At step 705, a set of related plan information items is determined based on identified associations between the plan information items and desired information items of a plan. The set of plan information items may be determined by a component that shares one or more characteristics with information identification engine 115. A plan may be, for example, "traveling to a location," and the plan may include desired information items of "flight reservations" and "hotel reservations." For example, identification engine 115 may identify a plan of traveling to Chicago a set of plan information items that includes multiple plan information items of the set having references to one or more related locations (e.g., hotel reservations in a city and web searches related to attractions in the same city). The plan information items of the set may be associated with desired information items of the task. For example, a plan information item that includes details of a hotel reservation may be associated with a "hotel reservations" desired information item of a plan of traveling to the location. Also, for example, a plan information item that includes car rental information may be associated with a "transportation type" desired information item of the plan of "traveling to a location."

At step 710, the plan information items of the set of plan information items may be utilized to determine deficient information for a plan. Deficient information engine 125 may determine one or more deficient information items based on identifying an insufficient association between a desired information item and the plan information items of the set. In some implementations, a deficient information item may be a desired information item of a plan that is not associated with a plan information item of the set and/or that is associated with a plan information item of the set with insufficient confidence. For example, a set of plan information items that includes a hotel reservation and flight information may be determined that is associated with a plan of traveling to a location. Desired information items for the plan may include "hotel reservations," "flight information," and "transportation information." Deficient information engine 125 may determine "transportation information" is a deficient information item based on the set of plan information items not including a plan information item that is associated with "transportation information." Also, for example, information identification engine 115 may have determined a plan information item related to transportation from one or more sources associated with the user but without sufficient certainty that the source includes information about transportation of the user. In some implementations, deficient information engine 125 may determine multiple deficient information items a plan.

At step 715, the user is provided with an inquiry that is related to the determined deficient information via an application executing on a client device of the user. The inquiry may be provided by a component that shares one or more characteristics with deficient information engine 125. In some implementations, the inquiry may include a notification to provide additional information that was not determined from other sources associated with the user. For example, the user may be provided with a notification that flight information has not been determined for an upcoming trip, and the user may be provided with a notification to identify a source that includes the flight information and/or to otherwise provide the information (e.g., enter information via text fields). In some implementations, the user may be provided with a notification to verify that one or more plan information items that were determined from one or more sources are correct. For example, hotel information may be determined from an email of the user but with a certainty that does not satisfy a threshold. The user may be provided with an inquiry to verify that the determined information is correct.

At step 720, additional information is received from the user in response to the provided inquiry. In some implementations, the additional information may be a confirmation of one or more plan information items. For example, the user may verify that one or more previously determined plan information items are correct. In some implementations, the received additional information may be utilized by suggestion engine 120 and/or information identification engine 115 to determine a new plan information item that is associated with the deficient information item. For example, the user may provide additional information that includes a source where an additional plan information item may be determined that is associated with the deficient information item (e.g., the desired information item that was not sufficiently associated with a plan information item). In some implementations, the additional information may include new information that may be associated with the deficient information item. For example, suggestion engine 120 may provide an inquiry that is related to deficient flight information and the user may provide additional information that includes flight dates and times, flight numbers, and/or arrival and departure airports to associate with the plan.

At step 725, a suggestion is provided to the user based on the additional information. In some implementations, the suggestion may be based on the plan information items of the set and tailored based on the additional information. For example, a suggestion of transportation from an airport to a hotel may be tailored based on the user providing information related to a rental car reservation. Alternatively, if the user provided additional information that is indicative of the user utilizing public transportation, the transportation suggestion may be tailored to include maps of public transit routes, public transit options, etc.

In some implementations, step 720 and/or step 725 are optionally performed. For example, one or more systems may perform steps 700 to 715 without receiving additional information from the user and/or providing a suggestion to the user based on the provided additional information.

FIG. 8 is a block diagram of an example computer system 810. Computer system 810 typically includes at least one processor 814 which communicates with a number of peripheral devices via bus subsystem 812. These peripheral devices may include a storage subsystem 824, including, for example, a memory subsystem 825 and a file storage subsystem 826, user interface input devices 822, user interface output devices 820, and a network interface subsystem 816. The input and output devices allow user interaction with computer system 810. Network interface subsystem 816 provides an interface to outside networks and is coupled to corresponding interface devices in other computer systems.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 810 to the user or to another machine or computer system.

Storage subsystem 824 stores programming and data constructs that provide the functionality of some or all of the modules described herein. For example, the storage subsystem 824 may include the logic to determine an inquiry to provide to the user that is related to deficient information associated with a plan of the user. As another example, the storage subsystem 824 may include the logic to determine a suggestion to provide to the user based on additional information provided by the user in response to an inquiry related to deficient information of a plan.

These software modules are generally executed by processor 814 alone or in combination with other processors. Memory 825 used in the storage subsystem can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be optionally stored by file storage subsystem 826 in the storage subsystem 824, or in other machines accessible by the processor(s) 814.

Bus subsystem 812 provides a mechanism for letting the various components and subsystems of computer system 810 communicate with each other as intended. Although bus subsystem 812 is shown schematically as a single bus, alternative implementations of the bus subsystem may use multiple busses.

Computer system 810 can be of varying types including a workstation, server, computing cluster, blade server, server farm, or any other data processing system or computing device. Due to the ever-changing nature of computers and networks, the description of computer system 810 depicted in FIG. 8 is intended only as a specific example for purposes of illustrating some implementations. Many other configurations of computer system 810 are possible having more or fewer components than the computer system depicted in FIG. 8.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:
1. A computer implemented method comprising:
identifying one or more plan information items from one or more sources associated with a user, wherein the sources are accessible to only: the user, and one or more components authorized by the user;

wherein identifying the plan information items comprises:
identifying a first information item of the information items based on content of an email sent to the user, and
identifying a second information item of the information items based on content of an additional source, wherein the additional source is an additional email or chat message sent by the user;

determining, utilizing one or more processors, a set of the plan information items based on similarity between the plan information items of the set and based on the plan information items of the set all being related to a plan, the set of the plan information items including the first information item and the second information item;

determining a confidence level for the second information item based on:
a type assigned to the additional source from which the second information item was identified,
presence of certain terms in the additional source from which the second information item was identified, and
absence of certain other terms in the additional source from which the second information item was identified;

storing, in a storage medium, each of the plan information items of the set in association with a corresponding desired information item defined for the plan, the storing including:
storing a first association between the first information item and a first desired information item of the corresponding desired information items,
storing a second association between the second information item and a second desired information item of the corresponding desired information items, and
storing the confidence level for the second information item in association with the second association;

determining, utilizing one or more of the processors, that the second desired information item is deficient based on the confidence level for the second information item failing to satisfy a threshold;

based on determining that the second desired information item is deficient, providing an inquiry, to a computing device of the user, that is related to the second information item stored in association with the second desired information item;

receiving additional information from the computing device in response to the inquiry;

modifying, in the storage medium and based on the additional information, the confidence level for the second information item;

determining that the modified confidence level satisfies the threshold; and in response to determining that the modified confidence level satisfies the threshold:
providing a suggestion to the client device, wherein the suggestion is based on both the first information item and the second information item.

2. The method of claim 1, further comprising:
determining, utilizing the one or more processors, a plurality of possible suggestions based on the set of the plan information items; and
selecting the suggestion from the plurality of possible suggestions based on the additional information.

3. The method of claim 2, wherein selecting the suggestion from the plurality of possible suggestions includes:
ranking the plurality of possible suggestions based on the additional information; and
selecting the possible suggestion based on the ranking.

4. A system including memory and one or more processors operable to execute instructions stored in memory, comprising instructions to:
identify plan information items from sources associated with a user, wherein the sources are accessible to only: the user, and one or more components authorized by the user;
wherein the instructions to identify the plan information items comprise instructions to:
identify a first information item of the information items based on content of an email sent to the user, and
identify a second information item of the information items based on an additional source, wherein the additional source is an additional email or chat message sent by the user;
determine a set of the plan information items based on similarity between the plan information items of the set and based on the plan information items of the set all being related to a plan, the set of the plan information items including the first information item and the second information item;
determine a confidence level for the second information item based on: a type assigned to the additional source, an originator of the additional source being the user, presence of certain terms in the additional source, or absence of certain other terms in the additional source;
store, in a storage medium, each of the plan information items of the set in association with a corresponding desired information item defined for the plan, wherein the instructions to store include instructions to:
store a first association between the first information item and a first desired information item of the corresponding desired information items,
store a second association between the second information item and a second desired information item of the corresponding desired information items, and
store the confidence level for the second information item in association with the second association;
determine that the second desired information item is deficient based on determining that the confidence level for the second information item fails to satisfy a threshold; and
based on determining that the second desired information item is deficient, provide an inquiry, to a computing device of the user, that is related to the second information item stored in association with the second desired information item.

5. The system of claim 4, wherein the plan is related to travel.

6. The system of claim 4, wherein the instructions further include instructions to:
receive additional information from the user responsive to the inquiry, wherein the additional information is related to the deficient information item;
determine a suggestion based on the additional information, wherein the suggestion is related to the plan; and
provide the suggestion to the user.

7. The system of claim 6, wherein the instructions further include instructions to:
tailor the suggestion based on the additional information.

8. The system of claim 6, wherein the instructions to determine the suggestion include instructions to:

determine a plurality of possible suggestions based on the set of the plan information items; and select the suggestion from the plurality of possible suggestions based on the additional information.

9. A non-transitory computer readable storage medium storing instructions executable by a processor, the instructions including instructions to:

identify plan information items from sources associated with a user, wherein the sources are accessible to only: the user, and one or more components authorized by the user;

wherein the instructions to identify the plan information items comprise instructions to:

identify a first information item of the information items based on content of an email sent to the user, and identify a second information item of the information items based on an additional source, wherein the additional source is an additional email or chat message sent by the user;

determine a set of the plan information items based on similarity between the plan information items of the set and based on the plan information items of the set all being related to a plan, the set of the plan information items including the first information item and the second information item;

determine a confidence level for the second information item based on two or more of: a type assigned to the additional source, an originator of the additional source being the user, presence of certain terms in the additional source, and absence of certain other terms in the additional source;

store, in a storage medium, each of the plan information items of the set in association with a corresponding desired information item defined for the plan, wherein the instructions to store include instructions to:

store a first association between the first information item and a first desired information item of the corresponding desired information items, store a second association between the second information item and a second desired information item of the corresponding desired information items, and store the confidence level for the second information item in association with the second association;

determine that the second desired information item is deficient based on determining that the confidence level for the second information item fails to satisfy a threshold;

based on determining that the second desired information item is deficient, provide an inquiry, to a computing device of the user, that is related to the second information item stored in association with the second desired information item receive additional information from the computing device in response to the inquiry; and modify, in the storage medium and based on the additional information, the confidence level for the second information item.

\* \* \* \* \*